(12) United States Patent
Choi

(10) Patent No.: US 10,506,496 B2
(45) Date of Patent: Dec. 10, 2019

(54) METHOD AND APPARATUS FOR BARRING NETWORK ACCESS IN MOBILE COMMUNICATION SYSTEM

(71) Applicant: SAMSUNG ELECTRONICS CO., LTD., Suwon-si, Gyeonggi-do (KR)

(72) Inventor: Woo-Jun Choi, Suwon-si (KR)

(73) Assignee: Samsung Electronics Co., Ltd., Suwon-si, Gyeonggi-Do (KR)

( * ) Notice: Subject to any disclaimer, the term of this patent is extended or adjusted under 35 U.S.C. 154(b) by 6 days.

(21) Appl. No.: 15/887,179

(22) Filed: Feb. 2, 2018

(65) Prior Publication Data

US 2018/0227830 A1    Aug. 9, 2018

(30) Foreign Application Priority Data

Feb. 3, 2017    (KR) .................. 10-2017-0015855

(51) Int. Cl.
   *H04W 48/06*    (2009.01)
   *H04W 48/10*    (2009.01)
   *H04W 28/02*    (2009.01)
   *H04W 48/16*    (2009.01)

(52) U.S. Cl.
   CPC ....... *H04W 48/06* (2013.01); *H04W 28/0289* (2013.01); *H04W 48/10* (2013.01); *H04W 48/16* (2013.01)

(58) Field of Classification Search
   CPC . H04W 28/0289; H04W 48/06; H04W 48/10; H04W 48/16
   See application file for complete search history.

(56) References Cited

U.S. PATENT DOCUMENTS

| | | | | |
|---|---|---|---|---|
| 6,311,055 | B1* | 10/2001 | Boltz | H04M 1/66 455/414.1 |
| 9,350,854 | B2 | 5/2016 | Booton | |
| 2010/0323673 | A1* | 12/2010 | Etram | H04M 1/663 455/414.1 |
| 2012/0020351 | A1* | 1/2012 | Booton | H04M 3/38 370/352 |
| 2013/0286829 | A1* | 10/2013 | Ishii | H04W 28/0205 370/230 |
| 2014/0171061 | A1* | 6/2014 | Larmo | H04W 74/006 455/422.1 |

OTHER PUBLICATIONS

3rd Generation Partnership Project; Technical Specification Group Services and System Aspects; Service accessibility (Release 14); 3GPP TS 22.011 V14.4.0 (Dec. 2016) (Year: 2016).*

* cited by examiner

*Primary Examiner* — Kashif Siddiqui
(74) *Attorney, Agent, or Firm* — Nixon & Vanderhye P.C.

(57) ABSTRACT

Disclosed are a method and/or an apparatus which allow a User Equipment (UE) to attempt to access a network in a mobile communication system. The UE for attempting to gain access to a network may include: a memory; a communication circuit; and a processor that is electrically connected to the memory and the communication circuit, wherein the processor may receive a first barring message from the network; may determine whether access to the network is barred, on the basis of a first random variable and the first barring message; when it is determined that the access to the network is barred, may acquire a first standby time period related to the barring of the access to the network on the basis of a second random variable and the first barring message; and may store the first standby time period in the memory.

18 Claims, 9 Drawing Sheets

METHOD AND APPARATUS FOR BARRING NETWORK ACCESS IN MOBILE COMMUNICATION SYSTEM

CROSS-REFERENCE TO RELATED APPLICATION

This application is based on and claims the priority under 35 U.S.C. § 119(a) to Korean Patent Application Serial No. 10-2017-0015855, which was filed in the Korean Intellectual Property Office on Feb. 3, 2017, the entire content of which is hereby incorporated herein by reference.

FIELD

The present disclosure relates to a method and/or an apparatus which allow a User Equipment (UE) to attempt to access a network in a mobile communication system.

BACKGROUND

Mobile communication systems are evolving to provide UEs with high-speed and large-capacity services. Representative examples of such mobile communication systems include a High-Speed Downlink Packet Access (HSDPA) mobile communication system, a High-Speed Uplink Packet Access (HSUPA) mobile communication system, a Long-Term Evolution (LTE) mobile communication system, a Long-Term Evolution-Advanced (LTE-A) mobile communication system, an Institute of Electrical and Electronics Engineers (IEEE) 802.16m mobile communication system, and the like.

The LTE mobile communication system has been developed to efficiently support high-speed wireless packet data transmission, and can maximize the capacity of a mobile communication system by utilizing various Radio Access (RA) technologies. The LTE mobile communication system proposes a Circuit Switched FallBack (CSFB) scheme capable of using both a circuit scheme and a packet scheme to support a voice call service. The CSFB scheme uses a Circuit-Switched call (CS call) together with Voice over LTE (VoLTE). Here, VoLTE supports voice calls using a packet scheme, and the CS call supports voice calls using a circuit scheme and was used by the conventional 2G/3G mobile communication system until VoLTE came to be stably served.

Meanwhile, when multiple UEs simultaneously attempt to access a network through a particular base station, excessive packet data is transmitted to the particular base station, which causes the occurrence of a congestion status, whereby the performance of the relevant network is reduced. For example, when due to the occurrence of an emergency situation such as a disaster, at least one base station becomes inoperative. This may occur, for example, when many people are crowded in a particular area, so that excessive network access through some base stations may occur.

SUMMARY

Various example embodiments of the present disclosure provide a method and/or an apparatus which, when a UE is attempting to access a network and a congestion status of the network occurs, the user of the UE can be provided with corresponding information at an end time point of the congestion status of the network.

In accordance with an example aspect of the present disclosure, a UE for attempting to gain access to a network is provided. The UE may include: a memory; a communication circuit; and a processor, including processing circuitry, that is electrically connected to the memory and the communication circuit, wherein the processor may receive a first barring message from the network; may determine whether access to the network is barred, on the basis of a first random variable and the first barring message; when it is determined that the access to the network is barred, may acquire a first standby time period related to the barring of the access to the network on the basis of a second random variable and the first barring message; and may store the first standby time period in the memory.

In accordance with another example aspect of the present disclosure, a method for attempting to gain access to a network by a UE is provided. The method may include: receiving a first barring message from the network; determining whether access to the network is barred, on the basis of a first random variable and the first barring message; when it is determined that the access to the network is barred, acquiring a first standby time period related to the barring of the access to the network on the basis of a second random variable and the first barring message; and storing the first standby time period in a memory.

According to various example embodiments of the present disclosure, a user of a UE can acquire corresponding information at an end time point of a congestion status of a network, and can know, based on the acquired information, a time point when barring of access to the network is removed and a voice call or video call can be re-originated.

Also, according to various example embodiments of the present disclosure, information related to a time point when a voice call or video call can be received can be provided to a person who is in an area where an emergency situation such as a disaster occurs or a lot of people are crowded and thus access to a network is barred.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
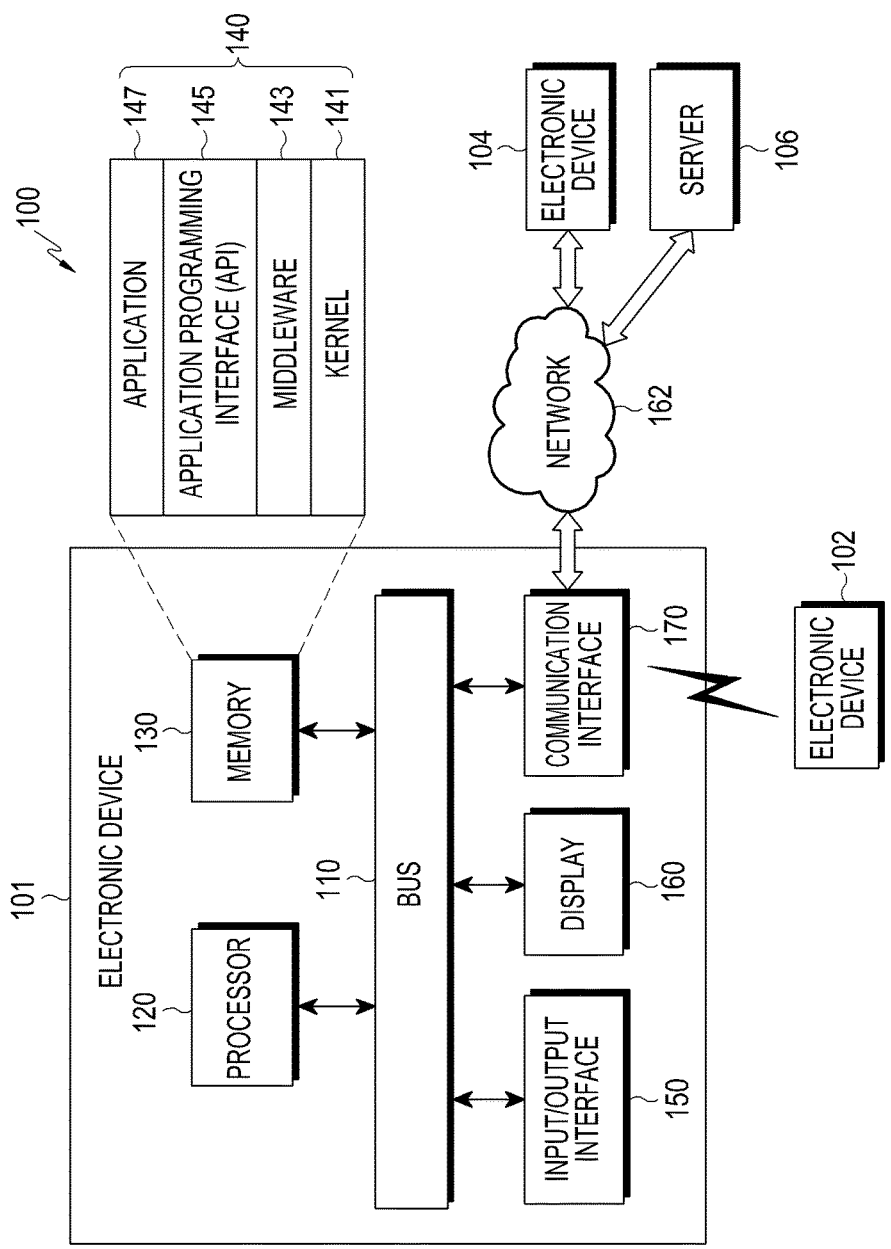
FIG. 1 is a view illustrating a network environment including an electronic device according to various embodiments of the present disclosure.

Hereinafter, various embodiments of the present disclosure will be described with reference to the accompanying drawings. It should be understood that the embodiments and the terms used herein are not intended to limit the present disclosure to the particular forms disclosed and the present disclosure aims to cover various modifications, equivalents, and/or alternatives of the corresponding embodiments. In the drawings, similar reference numerals are used to designate similar elements. As used herein, the singular forms may include the plural forms as well, unless the context clearly indicates otherwise. In the present disclosure, the expression "A or B" or "at least one of A and/or B" may include all possible combinations of the items listed. The expression "a first", "a second", "the first", or "the second" may modify corresponding elements regardless of the order or importance thereof, and is used only to distinguish one element from another element, but does not limit the corresponding elements. When an element (e.g., first element) is referred to as being (operatively or communicatively) "connected" or "coupled" to another element (e.g., second element), the element may be connected directly to the another element or connected to the another element through any other element(s) (e.g., third element).

In the present disclosure, the expression "configured to" may be exchanged with, for example, "suitable for", "having the capacity to", "adapted to", "made to", "capable of", or "designed to" in terms of hardware or software, according to circumstances. In some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a medical device, a camera, and a wearable device. According to various embodiments of the present disclosure, the wearable device may include at least one of an accessory type (e.g., a watch, a ring, a bracelet, an anklet, a necklace, glasses, a contact lens, or a Head-Mounted Device (HMD)), a fabric- or clothing-integrated type (e.g., an electronic clothing), a body-mounted type (e.g., a skin pad or tattoo), and a bio-implantable type (e.g., an implantable circuit).

According to another embodiment of the present disclosure, the electronic device may include at least one of a navigation device, a Global Navigation Satellite System (GNSS), an Event Data Recorder (EDR), a Flight Data Recorder (FDR), a vehicle infotainment device, electronic devices for a ship (e.g., a navigation device for a ship, a gyro-compass, etc.), avionics, and security devices. The electronic device according to an embodiment of the present disclosure is not limited to the aforementioned devices. In the present disclosure, the term "user" may indicate a person using an electronic device or a device (e.g. an artificial intelligence electronic device) using an electronic device.

Referring to FIG. 1, a description will be made of an electronic device 101 within a network environment 100 according to various example embodiments of the present disclosure. The electronic device 101 may include a bus 110, a processor (including processing circuitry) 120, a memory 130, an input/output interface (including input and/or output interface circuitry) 150, a display 160, and a communication interface (including communication interface circuitry) 170. In some example embodiments of the present disclosure, at least one of the above elements of the electronic device 101 may be omitted from the electronic device 101, or the electronic device 101 may additionally include other elements. The bus 110 may include a circuit that interconnects the elements 120 to 170 and delivers a communication (e.g., a control message or data) between the elements 120 to 170. The processor 120 may include one or more of a CPU, an AP, and a Communication Processor (CP). The processor 120 may perform, for example, calculations and/or data processing related to control over and/or communication by at least one of the other elements of the electronic device 101.

The memory 130 may include a volatile memory and/or a non-volatile memory. The memory 130 may store, for example, commands and/or data related to at least one of the other elements of the electronic device 101. According to an example embodiment of the present disclosure, the memory 130 may store software and/or a program 140. The program 140 may include, for example, a kernel 141, middleware 143, an Application Programming Interface (API) 145, and/or an application program (or an application) 147. At least one of the kernel 141, the middleware 143, and the API 145 may be referred to as an "Operating System (OS)." For example, the kernel 141 may control or manage system resources (e.g., the bus 110, the processor 120, the memory 130, etc.) used to execute operations or functions implemented by the other programs (e.g., the middleware 143, the API 145, and the application program 147). Also, the kernel 141 may provide an interface capable of controlling or managing the system resources by accessing the individual elements of the electronic device 101 by using the middleware 143, the API 145, and/or the application program 147.

For example, the middleware 143 may serve as an intermediary that enables the API 145 or the application program 147 to communicate with the kernel 141 and to exchange data therewith. Also, the middleware 143 may process one or more task requests received from the application program 147 according to a priority. For example, the middleware 143 may assign a priority, which enables the use of system resources (e.g., the bus 110, the processor 120, the memory 130, etc.) of the electronic device 101, to at least one of the application programs 147, and may process the one or more task requests according to the assigned priority. The API 145 may be an interface through which the application 147 controls a function provided by the kernel 141 or the middleware 143, and may include, for example, at least one interface or function (e.g., command) for file control, window control, image processing, character control, or the like. For example, the input/output interface 150 may deliver a command or data, which is input from a user or another external device, to the element(s) other than the input/output interface 150 within the electronic device 101, or may output, to the user or another external device, commands or data received from the element(s) other than the input/output interface 150 within the electronic device 101.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, an IPS display, and an electronic paper display. For example, the display 160 may display various pieces of content (e.g., text, images, videos, icons, symbols, and/or the like.) to the user. The display 160 may include a touch screen, and may receive, for example, a touch input, a gesture input, a proximity input, or a hovering input provided by an electronic pen or a body part of the user.

The communication interface 170 may establish, for example, communication between the electronic device 101 and an external device(s) (e.g., a first external electronic device 102, a second external electronic device 104, and/or a server 106). For example, the communication interface 170 may be connected to a network 162 through wireless or wired communication and may communicate with the external device (e.g., the second external electronic device 104 or the server 106).

The types of wireless communication may include, for example, cellular communication which uses at least one of Long-Term Evolution (LTE), LTE-Advanced (LTE-A), Code Division Multiple Access (CDMA), Wideband CDMA (WCDMA), Universal Mobile Telecommunications System (UMTS), WiBro (Wireless Broadband), and Global System for Mobile Communications (GSM). According to an embodiment of the present disclosure, the types of wireless communication may include at least one of, for example, Wi-Fi, Bluetooth, Bluetooth Low Energy (BLE), ZigBee, Near Field Communication (NFC), magnetic secure transmission, Radio Frequency (RF), and Body Area Network (BAN). According to an embodiment of the present disclosure, the types of wireless communication may include a GNSS. The GNSS may be, for example, a Global Positioning System (GPS), a Global Navigation Satellite System (GLONASS), a BeiDou Navigation Satellite System (hereinafter "BeiDou"), or a European Global Satellite-based Navigation System (Galileo). Hereinafter, in the present disclosure, the term "GPS" may be used interchangeably with the term "GNSS." The types of wired communication may include at least one of, for example, a Universal Serial Bus (USB), a High Definition Multimedia Interface (HDMI), Recommended Standard 232 (RS-232), Power Line communication (PLC), and a Plain Old Telephone Service (POTS). The network 162 may include at least one of telecommunication networks, such as a computer network (e.g., a Local Area Network (LAN) or a Wide Area Network (WAN)), the Internet, and a telephone network.

Each of the first and second external electronic devices 102 and 104 may be of a type identical to or different from that of the electronic device 101. According to various example embodiments of the present disclosure, all or some of operations performed by the electronic device 101 may be performed by another electronic device or multiple electronic devices (e.g., the first and second external electronic devices 102 and 104 or the server 106). According to an example embodiment of the present disclosure, when the electronic device 101 needs to perform some functions or services automatically or by a request, the electronic device 101 may send, to another device (e.g., the first external electronic device 102, the second external electronic device 104, and/or the server 106), a request for performing at least some functions related to the functions or services, instead of performing the functions or services by itself, or additionally. Another electronic device (e.g., the first external electronic device 102, the second external electronic device 104, and/or the server 106) may execute the requested functions or the additional functions, and may deliver a result of the execution to the electronic device 101. The electronic device 101 may process the received result without any change or may add information thereto, and may provide the requested functions or services. To this end, use may be made of, for example, cloud computing technology, distributed computing technology, or client-server computing technology.

Figure 2:
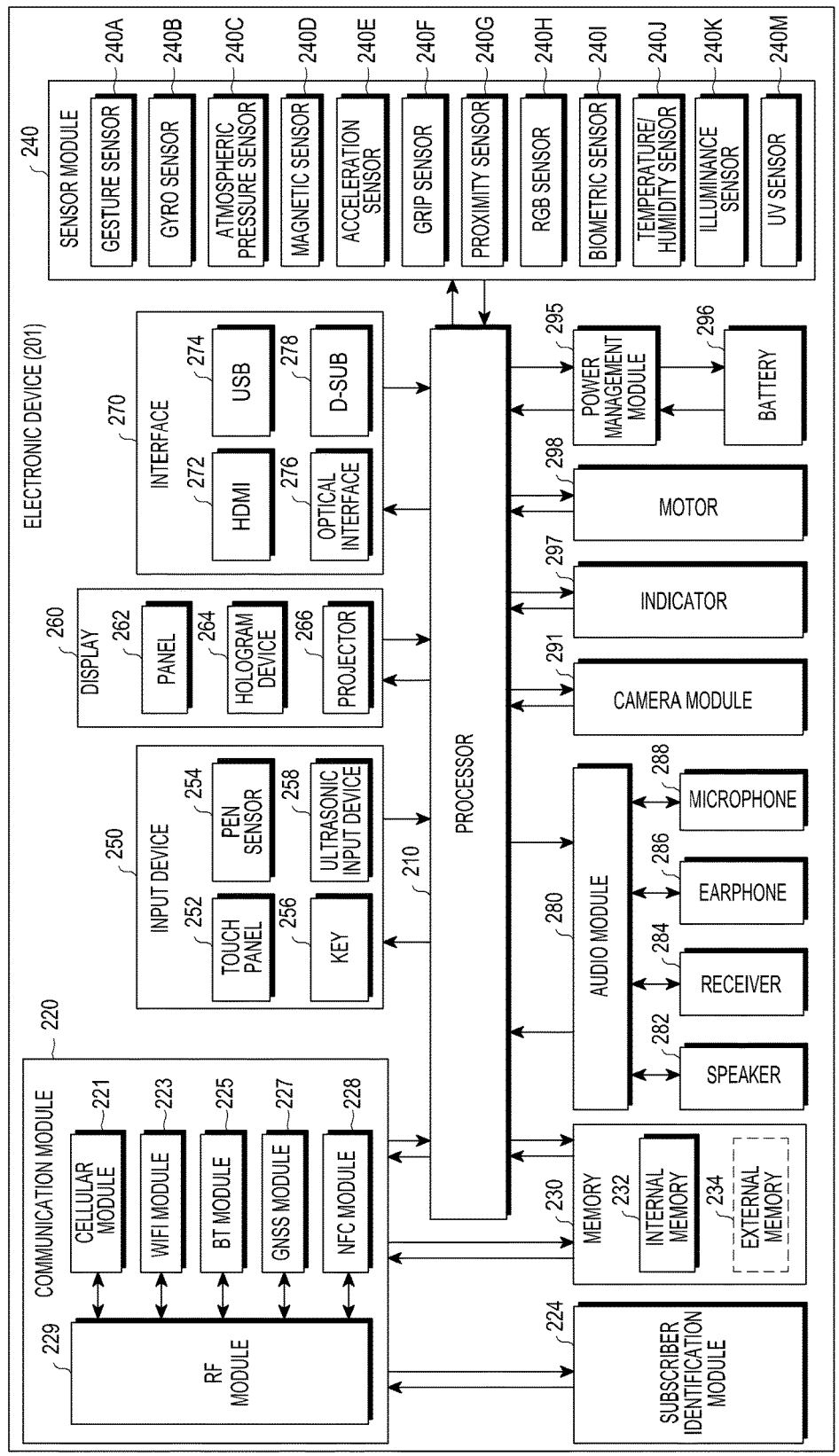
FIG. 2 is a block diagram illustrating a configuration of an electronic device according to various embodiments of the present disclosure.

FIG. 2 is a block diagram illustrating a configuration of an electronic device 201 according to various example embodiments of the present disclosure. The electronic device 201 may include, for example, the whole or part of the electronic device 101 illustrated in FIG. 1. Thus, the electronic device 101 in FIG. 1 may be the electronic device 201 shown in FIG. 2. The electronic device 201 may include at least one processor (e.g., an AP) 210, a communication module 220, a subscriber identification module 224, a memory 230, a sensor module 240, an input apparatus 250, a display 260, an interface 270, an audio module 280, a camera module 291, a power management module 295, a battery 296, an indicator 297, and a motor 298. The processor 210 may control multiple hardware or software elements connected to the processor 210 and may perform the processing of and arithmetic operations on various data, by running, for example, an OS or an application program.

The processor 210 may be implemented by, for example, a System on Chip (SoC). According to an example embodiment of the present disclosure, the processor 210 may further include a Graphics Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store the resulting data in a non-volatile memory.

The communication module 220 may have a configuration identical or similar to that of the communication interface 170. The communication module 220 may include, for example, the cellular module 221, a Wi-Fi module 223, a Bluetooth (BT) module 225, a GNSS module 227, an NFC module 228, and an RF module 229, each of which may include circuitry for performing the recited functions. For example, the cellular module 221 may provide a voice call, a video call, a text message service, an Internet service, and the like through a communication network. According to an example embodiment of the present disclosure, the cellular module 221 may identify or authenticate the electronic device 201 in the communication network by using the subscriber identification module (e.g., a Subscriber Identity Module (SIM) card) 224. According to an example embodiment of the present disclosure, the cellular module 221 may perform at least some of the functions that the processor 210 may provide. The cellular module 221 may include a CP. According to some example embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package. The RF module 229 may transmit and receive, for example, communication signals (e.g., RF signals). The RF module 229 may include, for example, a transceiver, a Power Amplifier Module (PAM), a frequency filter, a Low Noise Amplifier (LNA), and an antenna. According to another example embodiment of the present disclosure, at least one of the cellular module 221, the Wi-Fi module 223, the BT module 225, the GNSS module 227, and the NFC module 228 may transmit and receive RF signals through a separate RF module. The subscriber identification module 224 may include, for example, a card including a subscriber identity module or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an internal memory 232 and/or an external memory 234. The internal memory 232 may include at least one of, for example, a volatile memory (e.g., a Dynamic Random Access Memory (DRAM), a Static RAM (SRAM), a Synchronous DRAM (SDRAM), etc.); and a non-volatile memory (e.g., a One-Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory, a hard drive, and a Solid State Drive (SSD)). The external memory 234 may include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally or physically connected to the electronic device 201 through various interfaces.

For example, the sensor module 240 may measure a physical quantity and/or may detect an operation state of the electronic device 201, and may convert the measured physical quantity or the detected operation state into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., a Red-Green-Blue (RGB) sensor), a biometric sensor 240I, a temperature/humidity sensor 240J, an illuminance sensor 240K, and an Ultraviolet (UV) sensor 240M, each of which may include circuitry for performing the recited functions. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor, each of which may include circuitry for performing the recited functions. The sensor module 240 may further include a control circuit for controlling one or more sensors included therein. In some example embodiments of the present disclosure, the electronic device 201 may further include a processor configured to control the sensor module 240 as a part of or separately from the processor 210, and may control the sensor module 240 while the processor 210 is in a sleep state.

The input apparatus 250 may include, for example, a touch panel 252, a (digital) pen sensor 254, a key 256, and/or an ultrasonic input unit 258. The touch panel 252 may use at least one of, for example, a capacitive scheme, a resistive scheme, an infrared scheme, and a surface acoustic wave scheme. Also, the touch panel 252 may further include a control circuit. The touch panel 252 may further include a tactile layer and may provide a tactile reaction to the user. The (digital) pen sensor 254 may include, for example, a recognition sheet that is a part of the touch panel or is separated from the touch panel. The key 256 may be, for example, a physical button, an optical key, and a keypad.

The ultrasonic input unit 258 may sense an ultrasonic wave generated by an input means through a microphone (e.g., a microphone 288), and may confirm data corresponding to the sensed ultrasonic wave.

The display 260 (e.g., the display 160) may include a panel 262, a hologram unit 264, a projector 266, and/or a control circuit for controlling the same. The panel 262 may be implemented to be, for example, flexible, transparent, or wearable. The panel 262 together with the touch panel 252 may be implemented as one or more modules. According to an example embodiment of the present disclosure, the panel 262 may include a pressure sensor (or a force sensor) capable of measuring the strength of pressure of a user's touch. The pressure sensor and the touch panel 252 may be integrated into one unit, or the pressure sensor may be implemented as one or more sensors separated from the touch panel 252. The hologram unit 264 may display a three-dimensional image in the air by using the interference of light. The projector 266 may display an image by projecting light onto a screen. The screen may be located, for example, inside or outside the electronic device 201. The interface 270 may include, for example, a High-Definition Multimedia Interface (HDMI) 272, a Universal Serial Bus (USB) 274, an optical interface 276, and a D-subminiature (D-sub) interface 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

For example, the audio module 280 may bidirectionally convert between a sound and an electrical signal. At least some elements of the audio module 280 may be included in, for example, the input/output interface 150 illustrated in FIG. 1. The camera module 291 is, for example, a device capable of capturing a still image and a moving image. According to an example embodiment of the present disclosure, the camera module 291 may include one or more image sensors (e.g., a front sensor or a back sensor), a lens, an Image Signal Processor (ISP), and a flash (e.g., an LED, a xenon lamp, or the like). The power management module 295 may manage, for example, power of the electronic device 201. According to an example embodiment of the present disclosure, the power management module 295 may include a Power Management Integrated Circuit (PMIC), a charger IC, or a battery or fuel gauge. The PMIC may use a wired and/or wireless charging method. Examples of the wireless charging method may include, for example, a magnetic resonance method, a magnetic induction method, an electromagnetic method, and the like. The PMIC may further include additional circuits (e.g., a coil loop, a resonant circuit, a rectifier, etc.) for wireless charging. The battery gauge may measure, for example, a residual quantity of the battery 296, and a voltage, a current, or a temperature during charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Each of the above-described elements according to the present disclosure may include one or more components, and the names of the corresponding elements may vary based on the type of electronic device. In various embodiments of the present disclosure, the electronic device (e.g., the electronic device 201) may omit some elements or may further include additional elements, or some of the elements of the electronic device may be combined into one entity, which may perform functions identical to those of the relevant elements before the combination thereof.

According to various example embodiments of the present disclosure, a UE (e.g., the electronic device 101) for attempting to gain access to a network may include: a memory (e.g., the memory 130); a communication circuit (e.g., the communication interface 170); and a processor (e.g., the processor 120) that is electrically connected to the memory and the communication circuit, wherein the processor may receive a first barring message from the network; may determine whether access to the network is barred, on the basis of a first random variable and the first barring message; when it is determined that the access to the network is barred, may acquire a first standby time period related to the barring of the access to the network on the basis of a second random variable and the first barring message; and may store the first standby time period in the memory.

According to various example embodiments of the present disclosure, the UE (e.g., the electronic device 101) for attempting to gain access to a network may include: a memory (e.g., the memory 130); a communication circuit (e.g., the communication interface 170); and a processor (e.g., the processor 120) that is electrically connected to the memory and the communication circuit, wherein the processor may determine whether the access to the network is continuously barred, on the basis of a third random variable and the first barring message; and when it is determined that the access to the network is not continuously barred, may activate a timer corresponding to the first standby time period, and may output information corresponding to the first standby time period.

According to various example embodiments of the present disclosure, the UE (e.g., the electronic device 101) for attempting to gain access to a network may include: a memory (e.g., the memory 130); a communication circuit (e.g., the communication interface 170); and a processor (e.g., the processor 120) that is electrically connected to the memory and the communication circuit, wherein the processor may determine whether the access to the network is continuously barred, on the basis of the third random variable and the first barring message; when it is determined that the access to the network is continuously barred, may acquire a second standby time period related to the barring of the access to the network on the basis of a fourth random variable and the first barring message; may store the second standby time period in the memory; and may store, in the memory, a third standby time period obtained by adding the first and second standby time periods.

According to various example embodiments of the present disclosure, the UE (e.g., the electronic device 101) for attempting to gain access to a network may include: a memory (e.g., the memory 130); a communication circuit (e.g., the communication interface 170); and a processor (e.g., the processor 120) that is electrically connected to the memory and the communication circuit, wherein the processor may output information corresponding to the third standby time period.

According to various example embodiments of the present disclosure, the UE (e.g., the electronic device 101) for attempting to gain access to a network may include: a memory (e.g., the memory 130); a communication circuit (e.g., the communication interface 170); and a processor (e.g., the processor 120) that is electrically connected to the memory and the communication circuit, wherein information, which is output to correspond to the first standby time period or the third standby time period, may be displayed in an area of an indicator (e.g., the indicator 297) on a screen of a display apparatus.

According to various example embodiments of the present disclosure, the UE (e.g., the electronic device 101) for attempting to gain access to a network may include: a memory (e.g., the memory 130); a communication circuit (e.g., the communication interface 170); and a processor (e.g., the processor 120) that is electrically connected to the memory and the communication circuit, wherein the processor may determine whether a signal related to origination of a voice call is received, and may control to display information, which is output to correspond to the first standby time period or the third standby time period, on a telephone call connection standby screen in response to the reception of the signal.

According to various example embodiments of the present disclosure, the UE (e.g., the electronic device 101) for attempting to gain access to a network may include: a memory (e.g., the memory 130); a communication circuit (e.g., the communication interface 170); and a processor (e.g., the processor 120) that is electrically connected to the memory and the communication circuit, wherein information, which is output to correspond to the first standby time period or the third standby time period, may be displayed in an area corresponding to at least one of multiple contacts included in a telephone call record list.

According to various example embodiments of the present disclosure, the UE (e.g., the electronic device 101) for attempting to gain access to a network may include: a memory (e.g., the memory 130); a communication circuit (e.g., the communication interface 170); and a processor (e.g., the processor 120) that is electrically connected to the memory and the communication circuit, wherein the first barring message may include information on at least one of a barring factor (BarringFactor) representing a probability of allowing the access to the network and a barring time (BarringTime) used to acquire the first standby time period.

According to various example embodiments of the present disclosure, the UE (e.g., the electronic device 101) for attempting to gain access to a network may include: a memory (e.g., the memory 130); a communication circuit (e.g., the communication interface 170); and a processor (e.g., the processor 120) that is electrically connected to the memory and the communication circuit, wherein the processor may determine whether a signal related to origination of a voice call is received, and when the signal has been received, may determine whether the access to the network is barred.

According to various example embodiments of the present disclosure, the UE (e.g., the electronic device 101) for attempting to gain access to a network may include: a memory (e.g., the memory 130); a communication circuit (e.g., the communication interface 170); and a processor (e.g., the processor 120) that is electrically connected to the memory and the communication circuit, wherein, in the determining whether the access to the network is barred, the processor may determine that the access to the network is not barred, when a barring factor (BarringFactor) included in the first barring message exceeds the first random variable; and may determine that the access to the network is barred, when the barring factor included in the first barring message is smaller than or equal to the first random variable.

According to various example embodiments of the present disclosure, the UE (e.g., the electronic device 101) for attempting to gain access to a network may include: a memory (e.g., the memory 130); a communication circuit (e.g., the communication interface 170); and a processor (e.g., the processor 120) that is electrically connected to the memory and the communication circuit, wherein the processor may receive a second barring message different from the first barring message from the network; may determine whether the access to the network is barred, on the basis of a third random variable and the second barring message; may acquire a second standby time period related to the barring of the access to the network on the basis of a fourth random variable and the second barring message, when it is determined that the access to the network is barred; and may change the first standby time period to the second standby time period.

Figure 3:
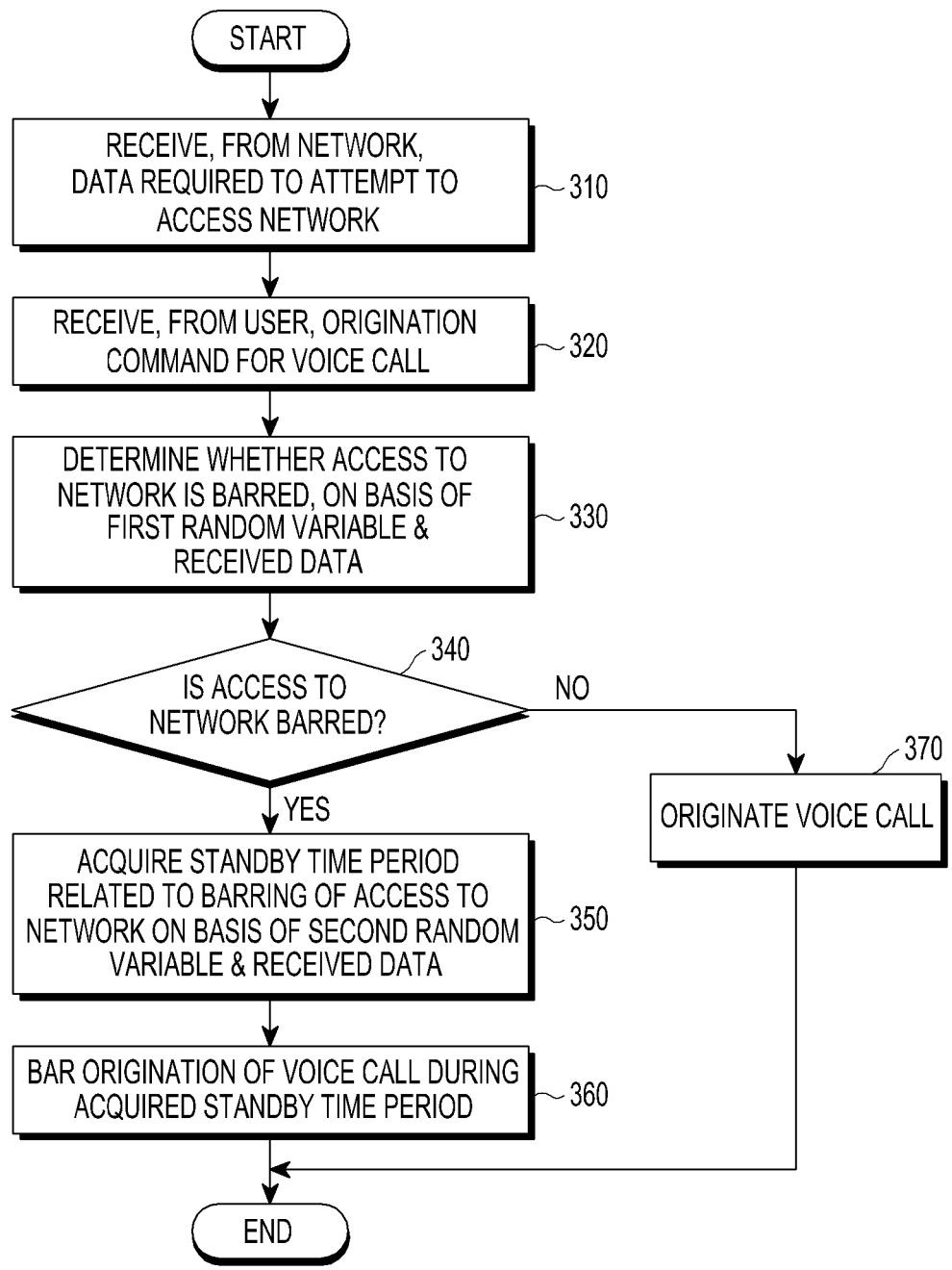
FIG. 3 is a flowchart illustrating a method for attempting to access a network by a UE according to various embodiments of the present disclosure.

FIG. 3 is a flowchart illustrating a method for attempting to access a network by a UE according to various example embodiments of the present disclosure.

In operation 310, the UE (e.g., the electronic device 101 or 201, such as a smart phone) may receive, from the network, data required to attempt to access the network. For example, the data required for the UE to attempt to access the network may be data required or used to determine whether access to the network is barred. The data may be or include a System Information Block Type 2 (SIB Type 2) message including an access barring parameter.

In operation 320, the UE, having received the data in operation 310, may determine whether an origination command for a voice call or video call has been received from a user of the UE. When the UE has received an origination command, in order to determine whether the voice call or video call is to be originated, in operation 330, the UE may determine whether access to the network is barred. The UE may determine whether the access to the network is barred, at least on the basis of a first random variable and the data received in operation 310.

When it is determined in operation 340 that the access to the network by the UE is barred, in operation 350, the UE may acquire a standby time period related to the barring of the access to the network on the basis of a second random variable and the data received in operation 310. The standby time period may signify a time period for removal of the barring of the access to the network. In other words, the UE may attempt to access the network after elapse of the standby time period.

In operation 360, the UE may bar the origination of a voice call or video call capable of being received from the user of the UE during the acquired standby time period.

When it is determined in operation 340 that the access to the network by the UE is not barred, in operation 370, the UE may originate a voice call or video call.

Figure 4:
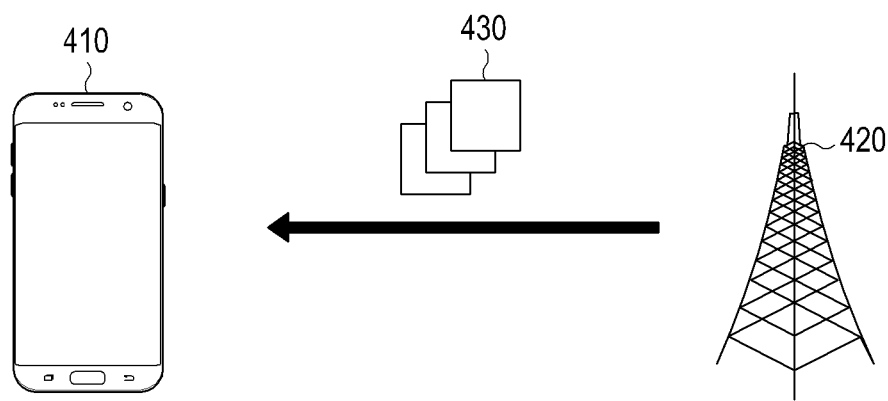
FIG. 4 is a view for explaining a method for receiving, from a network, data required for an attempt made by a UE to access the network according to various embodiments of the present disclosure.

FIG. 4 is a view for explaining a method for receiving, from a network, data required for an attempt made by a UE to access the network according to various example embodiments of the present disclosure.

According to an example embodiment of the present disclosure, the UE 410 (e.g., 101 and/or 201) may receive, from the network 420, data 430 required and/or used to attempt to access the network 420. The UE 410 may signify the electronic device 101 illustrated in FIG. 1. The network 420 may signify the network 162 illustrated in FIG. 1, and may signify a wireless communication system including at least one base station (e.g., enhanced Node B (eNB)). The data 430 may include data required to determine whether access to the network by the UE 410 is barred, and may be of a SIB Type 2.

According to an example embodiment of the present disclosure, the UE 410 may attempt to access the network in order to perform a voice call or video call, or the like, with another UE. However, when due to the occurrence of an emergency situation such as a disaster, at least one base station becomes inoperative or a lot of users originate voice calls or video calls by using their UEs in order to deliver their news and/or situation, overload may be caused due to traffic of the network 420, and thus, congestion may occur in the network 420.

The network 420 may transmit, to the UE 410, the data 430 for control of congestion on the basis of system information of a cell in which the congestion occurs among cells controlled by the network 420 itself. The data 430 may be, for example, Access Class Barring (ACB) (refer to TS 36.331)-related information, information having a form similar to that of ACB, and/or information having another form applied to only the UE 410. ACB aims at controlling an attempt to establish an RRC (Radio Resource Control) connection by the UE in an idle state, and may differently control connection establishment according to a purpose for which the UE in an idle state is desired to establish an RRC connection. ACB may be broadcasted through SIB Type 2, and may include one or more of three types of information described below.

i) ac-BarringForEmergency, ii) ac-BarringForMO-Signalling, and iii) ac-BarringForMO-Data ac-BarringForEmergency is information for control of connection establishment for an emergency call. ac-BarringForMO-Signalling is information for control of connection establishment for transmission of signalling information such as Tracking Area Update (TAU). ac-BarringForMO-Data is information for control of connection establishment for transmission of Mobile Orienting (MO) data of the UE. ac-BarringForMO-Data may include ac-BarringFactor and ac-BarringTime which are subordinate information. Among the three types of information, particularly, ac-BarringForMO-Data may be used for the purpose of controlling the use of the UE 410 for random access that attempts to access the network. This is because in most cases, the use of the UE 410 for random access is for transmission of MO data.

The SIB Type 2 may include at least one piece of information among ac-BarringForCSFB which is ACB for CSFB, ac-BarringForSpecialAC which is ACB for a special access class, ssac-BarringForMMTEL-Voice which is service-specific ACB for origination of an MMTEL voice, and ssac-BarringForMMTEL-Video which is service-specific ACB for origination of an MMTEL video.

According to an example embodiment of the present disclosure, the network 420 may signify an LTE mobile communication system. When a congestion phenomenon occurs in the network 420 of the LTE mobile communication system, a base station (eNB) included in the network 420 may bar access to the network by UEs through the base station itself on the basis of Service-Specific Access Control (SSAC) barring included in third Generation Partnership Project (3GPP) Rel.9. The SSAC may signify service-specific access control, and the SSAC barring may signify the barring of the origination of a voice call and video call using the LTE mobile communication system according to preset conditions. For example, the base station may transmit, to the UEs, a SIB Type 2 message including an access barring parameter, and thereby may control access to the base station itself by the UEs.

Figure 5:
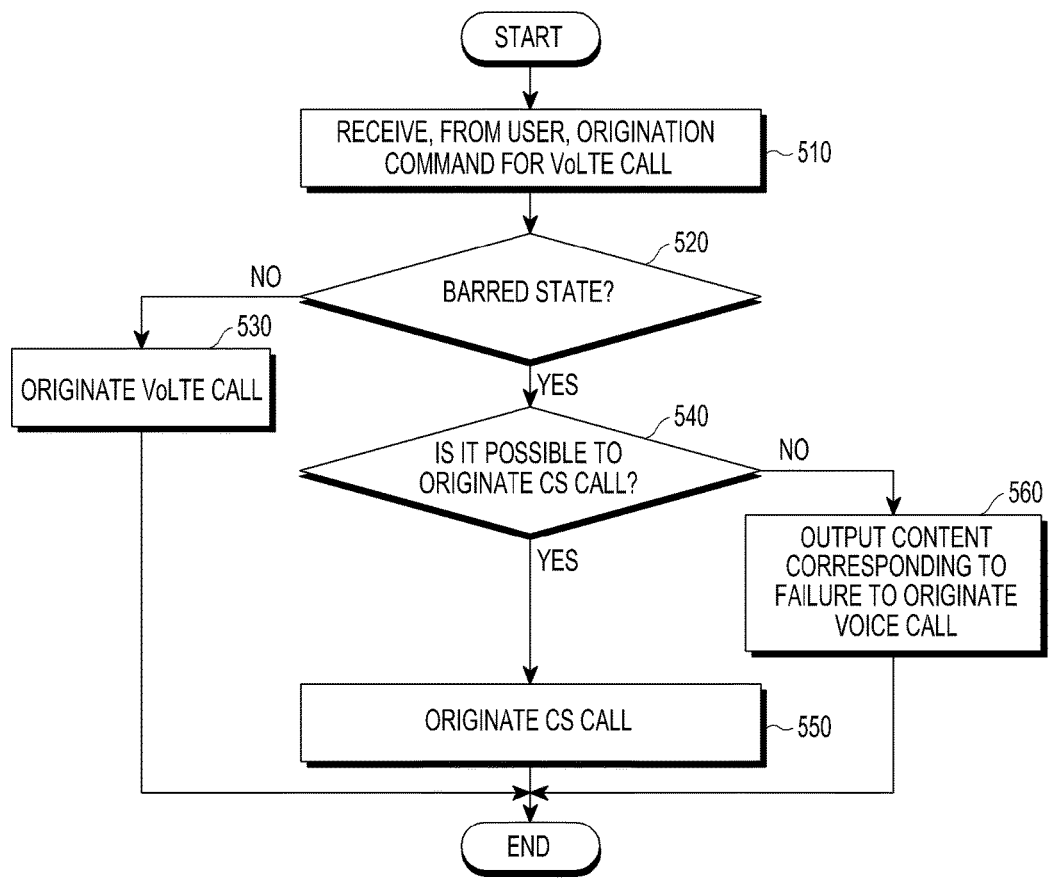
FIG. 5 is a flowchart illustrating a method for originating a voice call by a UE according to various embodiments of the present disclosure.

FIG. 5 is a flowchart illustrating a method for originating a voice call by a UE according to various example embodiments of the present disclosure.

According to an example embodiment of the present disclosure, the UE may include at least one processor (e.g., the processor 120) and a transmission/reception unit (e.g., the communication interface 170).

In operation 510, the processor of the UE may receive an origination command for a VoLTE call, which is a voice call using a packet scheme, from a user. For example, a first user of a first UE may input an origination command for the VoLTE call to the first UE in order to perform a voice call to/with a second user of a second UE through an LTE mobile communication system.

In operation 520, the processor of the UE may determine whether the UE is in a barred state, in response to the received origination command for the VoLTE call. The barred state may be determined based on data received from a network before the origination command for the VoLTE call, which is a voice call using the packet scheme, is received from the user in operation 510. For example, before receiving the origination command for the VoLTE call, which is a voice call using the packet scheme, from the user, the processor of the UE may receive, from the network, data related to the barring of access to the network. The processor of the UE may determine whether access to the network is barred, on the basis of the data received from the network, and may generate a timer corresponding to a time period during which access to the network is barred.

For example, in operation 520, the processor of the UE may determine that the UE is currently not in the barred state. In this case, in operation 530, the processor of the UE may originate a voice call corresponding to the received origination command for the VoLTE call.

For example, in operation 520, the processor of the UE may determine that the UE is currently in the barred state. In this case, the processor of the UE may determine that it is impossible to originate the VoLTE call, and in operation 540, may determine whether it is possible to originate a CS call which is a voice call using a circuit scheme.

When it is determined that it is possible to originate the CS call which is a voice call using the circuit scheme, in operation 550, the processor of the UE may originate the CS call.

When it is determined that it is impossible to originate the CS call which is a voice call using the circuit scheme, in operation 560, the processor of the UE may output content corresponding to the failure to originate the voice call. For example, the processor of the UE may predict an end time point of the barred state by using the timer generated to correspond to the time period during which the access to the network is barred. The processor of the UE may output the predicted end time point on the display of the UE for example. Although a screen output on the display is described as an example of the content corresponding to the failure to originate the voice call, embodiments of the present disclosure are not limited thereto. Accordingly, examples of the content may include various forms of content, including a vibration, a sound alarm, and the like.

Figure 6:
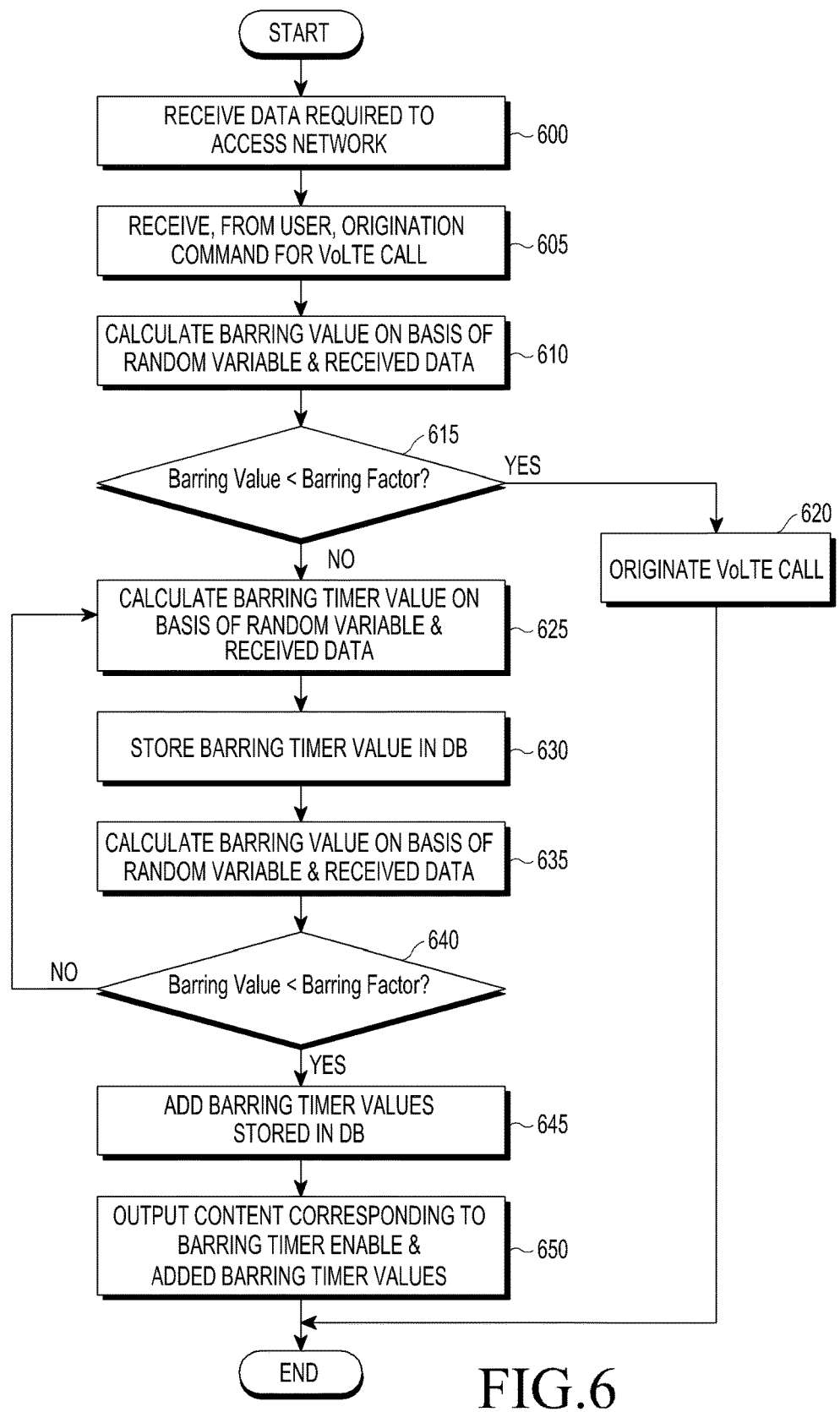
FIG. 6 is a flowchart illustrating a method for determining, by a UE, whether access to a network is barred according to various embodiments of the present disclosure.

FIG. 6 is a flowchart illustrating a method for determining, by a UE, whether access to a network is barred according to various example embodiments of the present disclosure.

According to an example embodiment of the present disclosure, when a VoLTE call, which is a voice call using a packet scheme, is triggered by a user using a UE for which access to the network is barred, in an LTE mobile communication system providing a CSFB scheme, it is possible to determine whether it is possible to originate a CS call which is a voice call using a circuit scheme, and thereby determine whether a voice call service is capable of being provided to the user. However, in an LTE mobile communication system that does not provide the CSFB scheme, it is impossible to originate a CS call which is a voice call using the circuit scheme, and thus, it is difficult to determine when barring of access to the network for a VoLTE call triggered by the user is to be removed. An embodiment of FIG. 7 can solve the above-described problem.

In operation 600, the UE may receive, from the network, data required or used to attempt to access the network. The data may signify data required to determine whether access to the network by the UE 410 is barred. For example, the data may be a SIB Type 2 including ACB.

In operation 605, the UE may determine whether an origination command for a VoLTE call corresponding to a voice call or video call using the packet scheme has been received by the UE from the user. For example, the user of the UE may make a telephone call by using the UE in order to perform a voice call or video call with a user of another UE.

In operation 610, the UE may calculate a barring value on the basis of a random variable and the received data.

The random variable may be generated by the UE at a time point when the UE has received the data required to attempt to access the network, or at any other suitable time. A time point when the UE generates the random variable may be determined as prescribed by the 3GPP or as previously configured. For example, the UE may generate rand1, which is a random variable, at the time point when the UE has received the data required to attempt to access the network. The generated rand1 may be stored in the memory of the UE, and may be used to determine a barring value. The barring value may be determined by Equation (1) below, or by any other suitable equation.

$$\text{Barring Value} = \text{rand1} \times \text{MAX\_BARRING\_FACTOR}, \quad (0 \le \text{rand1} \le 1) \quad (1)$$

In Equation (1), rand1 represents a random variable generated by the UE at a predetermined time point, MAX_BARRING_FACTOR represents a random variable used to determine whether access to a network is barred and may be set to 100.

In operation 615, the UE may compare the magnitude of the barring factor with that of the barring value, and thereby may determine whether the access to the network by the UE is barred. The barring factor is data included in the data received the UE from the network, and may be ac-BarringFactor or mBarringFactor[mType] for example. The network in which congestion occurs may transmit, to the UE, at least one of the ac-BarringF actor and the mBarringFactor[mType], and at least one UE having received the ac-BarringFactor or mBarringFactor[mType] may bar the access to the network by the UE according to a condition. For example, a condition for barring the access to the network by the UE may be as described in Table 1 below.

TABLE 1

```
if (Barring Value < Barring Factor)
{
// access to network by UE is not barred.
}else {
// access to network by UE is barred.
}
```

In Table 1, a barring factor may be a value which is larger than or equal to 0 and is smaller than or equal to 100. When the barring factor is 0, a probability of barring the access to the network by the UE is 100%. When the barring factor is 100, a probability of barring the access to the network by the UE is 0%.

When (barring value<barring factor) is determined to be true, that is, a barring value is smaller than a barring factor, it may be determined that the access to the network by the UE is not barred. In this case, in operation 620, the UE may originate a VoLTE call corresponding to the voice call or video call using the packet scheme received from the user of the UE.

When (barring value<barring factor) is determined to be false, that is, a barring value is larger than or equal to a barring factor, it may be determined that the access to the network by the UE is barred. In this case, in operation 625, the UE may calculate a barring timer value on the basis of a random variable and the received data.

The random variable may be generated by the UE at the time point when the UE has received the data required to attempt to access the network, or at any other suitable time. A time point when the UE generates the random variable may be determined as prescribed by the 3GPP or as previously configured. The random variable used in operation 625 may be different from rand1 which is a random variable used in operation 610. For example, the UE may generate rand2, which is a random variable, at the time point when the UE has received the data required to attempt to access the network. The generated rand2 may be stored in the memory of the UE, and may be used to determine a barring timer value. The barring timer value may be determined by Equation (2) below, or via any other suitable equation.

$$\text{Barring Timer Value}=(0.7+0.6\times \text{rand2})\times \text{Barring Time}, \quad (0\leq \text{rand2}\leq 1) \quad (2)$$

In Equation (2), rand2 represents a random variable generated by the UE at a predetermined time point, and a barring time represents data included in the data received by the UE from the network and may be ac-BarringTime. The ac-BarringTime is a variable signifying a time period during which the access to the network by the UE is barred, and may be included in a SIB Type 2.

When the operation of calculating, by the UE, a barring timer value on the basis of the random variable and the received data is completed, in operation 630, the UE may store the calculated barring timer value in the memory (or database) of the UE.

Then, in operation 635, the UE may calculate a barring value on the basis of a random variable and the received data. Operation 635 is the repetition of operation 610, and the random variable may be generated by the UE at a time point of execution of operation 635. The random variable used in operation 635 may be different from rand1 or rand2 which is a random variable used in operation 610 or 625. For example, the UE may generate rand3, which is a random variable, at the time point of the execution of operation 635. The generated rand3 may be stored in the memory of the UE, and may be used to determine a barring value. The barring value may be determined by Equation (1).

In operation 640, the UE may compare the magnitude of the barring factor with that of the barring value generated in operation 635, and thereby may determine whether the access to the network by the UE is barred. In other words, operation 635 is a step of determining whether the barred state of the access to the network determined in operation 615 continues. The barring factor used in operation 640 is data included in the data received by the UE from the network, and may be ac-BarringFactor or mBarringFactor [mType]. That is, the barring factor used in operation 640 may have the same value as the barring factor used in operation 615. To this end, consideration is given to a case where data additionally received by the UE from the network other than the data received in operation 600 does not exist. For example, the UE may compare the magnitude of the barring factor with that of the barring value generated in operation 635, on the basis of Table 1 which shows the condition for barring the access to the network by the UE.

When the expression (barring value<barring factor) is determined to be true, that is, the barring value generated in operation 635 is smaller than the barring factor, it may be determined that the barred state of the access to the network by the UE does not continue. In this case, in operation 645, the UE may add together the barring timer values stored in the memory of the UE. According to an example embodiment of the present disclosure, the barring timer value currently stored in the memory of the UE is only the barring timer value stored in operation 630, and thus, the added barring timer values may be the barring timer value stored in operation 630.

Then, in operation 650, the UE may output content corresponding to a barring timer enable and the added barring timer values. The barring timer enable may signify an operation of causing the timer, which has been initiated to correspond to the added barring timer values, to operate, and an attempt made by the UE to access the network may be barred until the added barring timer values pass from a time point when the timer operates. Also, by using the timer, the UE may predict an end time point of the barred state. The UE may output the predicted end time point on the display of the UE.

When the expression (barring value<barring factor) is determined to be false, that is, the barring value generated in operation 635 is larger than or equal to the barring factor, it may be determined that the barred state of the access to the network by the UE continues. In this case, the UE may repeat operation 625 again, and may calculate a barring timer value on the basis of a random variable and the received data. Operations 625 to 640 may be repeated until a result of the determination of (barring value<barring factor) in operation 640 is true. All of the barring timer values additionally generated in the process of repeating operations 625 to 640 may be stored in the memory of the UE, and the barring timer values stored in the memory may be added together in operation 645. When operations 625 to 640 are repeated until a result of the determination of (barring value<barring factor) in operation 640 is true, the UE may predict an end time point of the barring of the access to the network by the UE.

Although the above-described embodiments of the present disclosure are related to an attempt to access a network which is made on an origination side of a VoLTE call, those skilled in the art can devise operations related to the attempt to access the network which are performed on a reception side of the VoLTE call on the basis of the above-described embodiments. For example, consideration may be given to a case where a user who is in a different area originates a voice call or video call to a user who is in an area where congestion occurs in a network due to the occurrence of an emergency situation such as a disaster. The user who is in the area experiencing congestion may predict a time point when the user can access the network by using his/her UE on the basis of the above-described embodiments. However, the user who is in the different area has difficulty in knowing how long he/she needs to wait until he/she can perform a telephone call with the user who is in the area experiencing congestion. In this case, the network may receive information on a time point when it is possible to access the network, from the user who is in the area experiencing congestion, and may transmit the received information to the user who is in the different area. Through this configuration, the user who is in the different area may also predict a time point when he/she will be able to perform a telephone call with the user who is in the area experiencing congestion.

Figure 7:
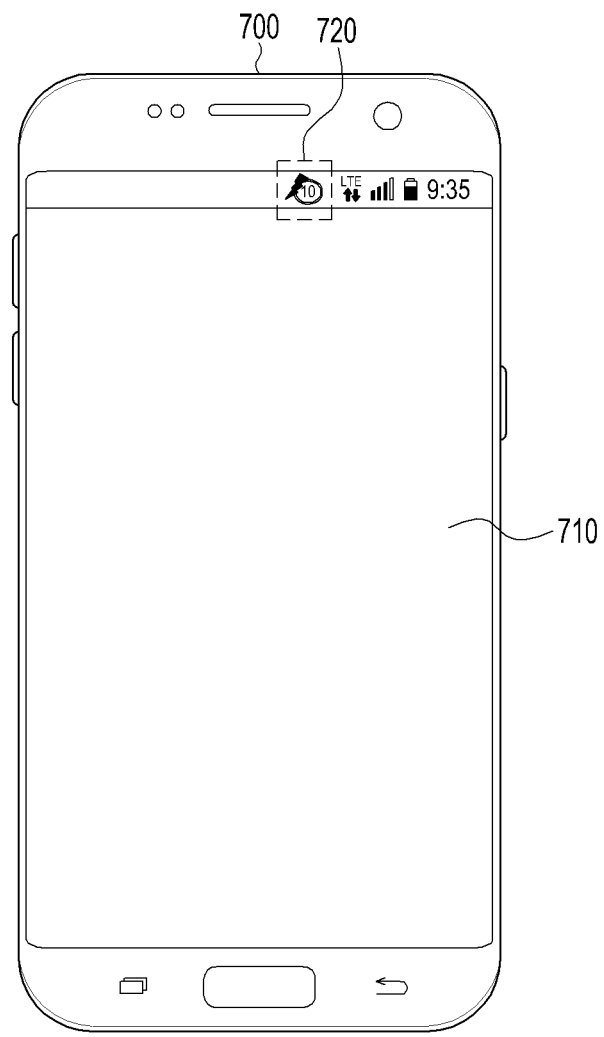
FIG. 7 is a view for explaining the display of content on a display of a UE according to various embodiments of the present disclosure.

FIG. 7 is a view for explaining the display of content on a display of a UE (e.g., 101, 201, 410, 700) according to various embodiments of the present disclosure.

The UE 700 according to an embodiment of the present disclosure may include a processor (not illustrated) (e.g., the processor 120), a memory (not illustrated) (e.g., the memory 130), and a display 710. The memory of the UE 700 may store the above-described methods. Also, the processor of the UE 700 may control the memory and the display 710 of the UE 700. More specifically, the processor of the UE 700 may execute each of the methods stored in the memory of the UE 700, and may output the above-described pieces of content on the display 710.

For example, when it is determined that access to a network by the UE 700 is in a barred state, the processor of the UE 700 may acquire time information on a time period during which the barred state continues. The UE 700 may output content 720, which corresponds to the acquired time information, on the display 710 (160, 260). The content 720 may include at least one image and/or number. The at least one image is used to express a barred state of access to the network, and the scope of the expression is not limited. Also, the number may signify a time period during which access to the network by the UE 700 is barred. For example, as illustrated in FIG. 7, the UE 700 may be able to access the network 10 seconds later. The number may be reduced to correspond to a remaining time period as in the case of a countdown timer.

Figure 8:
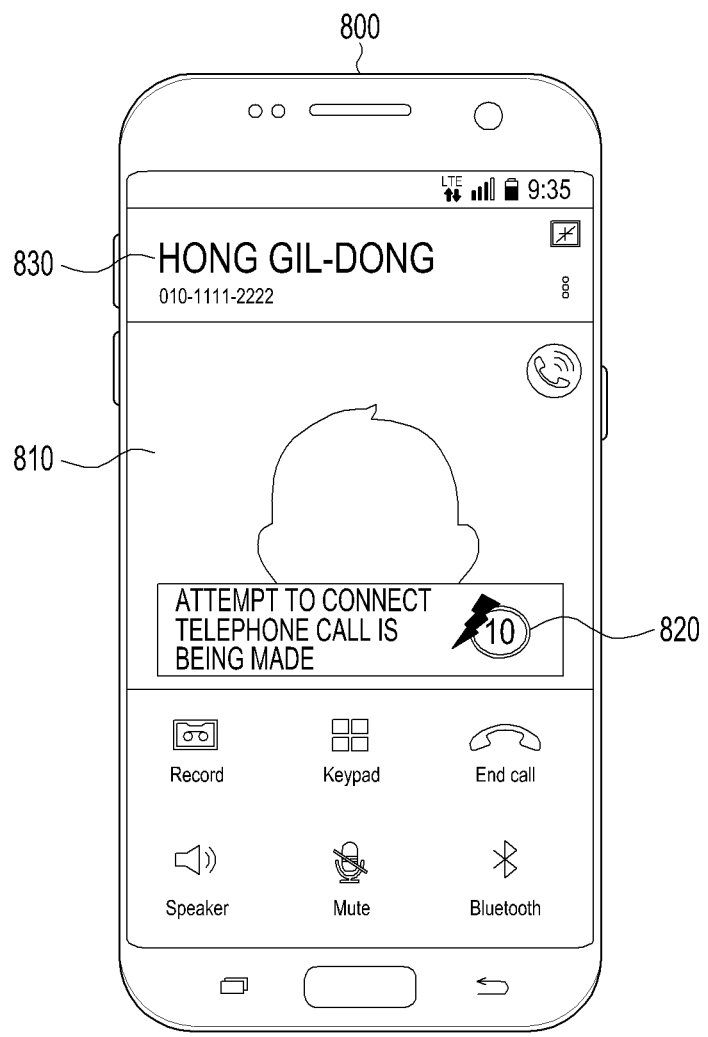
FIG. 8 is a view for explaining the display of content on a display of a UE according to various embodiments of the present disclosure.

FIG. 8 is a view for explaining the display of content on a display of a UE (e.g., 101, 201, 410, 700, 800) according to various example embodiments of the present disclosure.

The UE 800 according to an example embodiment of the present disclosure may include a processor (not illustrated) (e.g., the processor 120), a memory (not illustrated) (e.g., the memory 130), and a display 810. The memory of the UE 800 may store the above-described methods. Also, the processor of the UE 800 may control the memory and the display 810 of the UE 800. More specifically, the processor of the UE 800 may execute each of the methods stored in the memory of the UE 800, and may output the above-described pieces of content on the display 810.

According to an example embodiment of the present disclosure, consideration may be given to a case where a user who is in an area, in which congestion occurs in a network due to the occurrence of an emergency situation such as a disaster, uses a UE to perform a telephone call with another user 830. The user who is in the area experiencing congestion may attempt to access the network by using his/her UE 800. For example, the user who is in the area experiencing congestion may attempt to originate a VoLTE call, which is a voice call or video call using a packet scheme, by using the UE 800. When access to the network by the UE 800 is in a barred state due to the occurrence of the congestion in the network, the UE 800 may output content 820 related to an end time point of the barred state on a screen, which shows that an attempt to connect a telephone call is being made, displayed on the display 810 (160, 260). In this case, the user who is in the area experiencing congestion may perform a telephone call with said another user 830 10 seconds later.

According to an example embodiment of the present disclosure, consideration may be given to a case where a user who is in a different area uses a UE to perform a telephone call with the user 830 who is in an area where congestion occurs in a network due to the occurrence of an emergency situation such as a disaster. The user who is in the different area may attempt to access the network by using his/her UE 800. When a connection with the user 830 who is in the area experiencing congestion is in a barred state, the UE 800 may output content 820 related to an end time point of the barred state on a screen, which shows that an attempt to connect a telephone call is being made, displayed on the display 810. In this case, the user who is in the different area may perform, 10 seconds later, a telephone call with the user 830 who is in the area experiencing congestion.

Figure 9:
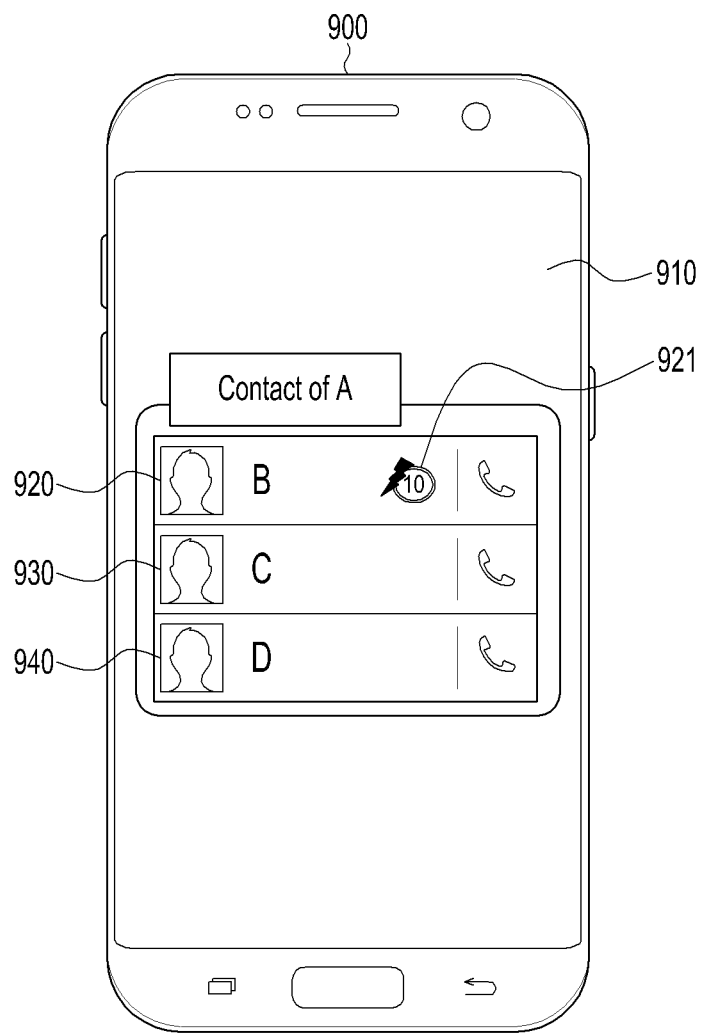
FIG. 9 is a view for explaining the display of content on a display of a UE according to various embodiments of the present disclosure.

FIG. 9 is a view for explaining the display of content on a display of a UE according to various example embodiments of the present disclosure.

The UE 900 according to an example embodiment of the present disclosure may include a processor (not illustrated) (e.g., the processor 120), a memory (not illustrated) (e.g., the memory 130), and a display 910. The memory of the UE 900 may store the above-described methods. Also, the processor of the UE 900 may control the memory and the display 910 of the UE 900. More specifically, the processor of the UE 900 may execute each of the methods stored in the memory of the UE 900, and may output the above-described pieces of content on the display 910.

According to an example embodiment of the present disclosure, the UE 900 may determine whether access to a network by each of UEs of users 920, 930, and 940, which correspond to at least one contact stored in the memory of the UE 900, is in a barred state. Content 921 displayed alongside the contact information of the user B 920 may indicate that access to the network by the UE of the user B 920 is in a barred state.

For example, it may be determined that the access to the network by the UE of the user B 920 is barred for 10 seconds according to the displayed content 921. Accordingly, a user of the UE 900 may perform a telephone call with the user B 920 10 seconds later. In contrast, it may be determined that the access to the network by each of the UEs of the user C 930 and the user D 940 is not currently barred. Accordingly, the user of the UE 900 may immediately perform a telephone call with each of the users C 930 and D 940.

According to various example embodiments of the present disclosure, a method for attempting to gain access to a network by a UE may include: receiving a first barring message from the network; determining whether access to the network is barred, on the basis of a first random variable and the first barring message; when it is determined that the access to the network is barred, acquiring a first standby time period related to the barring of the access to the network on the basis of a second random variable and the first barring message; and storing the first standby time period in a memory.

According to various example embodiments of the present disclosure, the method for attempting to gain access to a network by the UE may include: determining whether the access to the network is continuously barred, on the basis of a third random variable and the first barring message; and when it is determined that the access to the network is not continuously barred, activating a timer corresponding to the first standby time period, and outputting information corresponding to the first standby time period.

According to various example embodiments of the present disclosure, the method for attempting to gain access to a network by the UE may include: determining whether the access to the network is continuously barred, on the basis of the third random variable and the first barring message; when it is determined that the access to the network is continuously barred, acquiring a second standby time period related to the barring of the access to the network on the basis of a fourth random variable and the first barring message; storing the second standby time period in the memory; and storing, in the memory, a third standby time period obtained by adding the first and second standby time periods.

According to various example embodiments of the present disclosure, the method for attempting to gain access to a network by the UE may include outputting information corresponding to the third standby time period.

According to various example embodiments of the present disclosure, in the method for attempting to gain access to a network by the UE, information, which is output to correspond to the first standby time period or the third standby time period, may be displayed in an area of an indicator (e.g., the indicator 297) on a screen of a display apparatus.

According to various example embodiments of the present disclosure, the method for attempting to gain access to a network by the UE may further include: determining whether a signal related to origination of a voice call is received by the UE; and in response to the reception of the signal, controlling to display information, which is output to correspond to the first standby time period or the third standby time period, on a telephone call connection standby screen.

According to various example embodiments of the present disclosure, in the method for attempting to gain access to a network by the UE, information, which is output to correspond to the first standby time period or the third standby time period, may be displayed in an area corresponding to at least one of multiple contacts included in a telephone call record list.

According to various example embodiments of the present disclosure, in the method for attempting to gain access to a network by the UE, the first barring message may include information on at least one of a barring factor (BarringFactor) representing a probability of allowing the access to the network and a barring time (BarringTime) used to acquire the first standby time period.

According to various example embodiments of the present disclosure, in the method for attempting to gain access to a network by the UE, the receiving of the first barring message may further include: determining whether a signal related to origination of a voice call is received; and in response to the reception of the signal, determining whether the access to the network is barred.

According to various example embodiments of the present disclosure, in the method for attempting to gain access to a network by the UE, the determining whether the access to the network is barred may further include: determining that the access to the network is not barred, when a barring factor (BarringFactor) included in the first barring message exceeds the first random variable; and determining that the access to the network is barred, when the barring factor included in the first barring message is smaller than or equal to the first random variable.

According to various example embodiments of the present disclosure, the method for attempting to gain access to a network by the UE may include: receiving a second barring message different from the first barring message from the network; determining whether the access to the network is barred, on the basis of a third random variable and the second barring message; acquiring a second standby time period related to the barring of the access to the network on the basis of a fourth random variable and the second barring message, when it is determined that the access to the network is barred; and changing the first standby time period to the second standby time period.

According to various example embodiments of the present disclosure, in a computer-readable recording medium recording a program for executing a method for attempting to gain access to a network by a User Equipment (UE), the method may include: receiving a first barring message from the network; determining whether access to the network is barred, on the basis of a first random variable and the first barring message; when it is determined that the access to the network is barred, acquiring a first standby time period related to the barring of the access to the network on the basis of a second random variable and the first barring message; and storing the first standby time period in a memory.

Each of the above-described elements of hardware according to the present disclosure may include one or more components, and the names of the corresponding elements may vary based on the type of electronic device. According to various embodiments of the present disclosure, the electronic device may include at least one of the elements described in the present disclosure. Some elements may be omitted from the electronic device or other additional elements may be further included therein. Also, some of the elements of the electronic device according to various embodiments of the present disclosure may be combined into one entity, which may perform functions identical to those of the relevant elements before the combination thereof.

The term "module" as used herein may include a unit implemented in hardware, software, or firmware, and for example, may be used interchangeably with the term "logic", "logical block", "component", "circuit", or the like. The "module" may be an integrated component, or a minimum unit for performing one or more functions or a part thereof. The "module" may be mechanically or electronically implemented, and may include, for example, an Application-Specific Integrated Circuit (ASIC) chip, a Field-Programmable Gate Array (FPGA), or a programmable logic device which performs certain operations and is already known or is to be developed in the future.

At least part of the device (e.g., modules or functions thereof) or the method (e.g., operations) according to various embodiments of the present disclosure may be implemented by an instruction which is stored in a computer-readable storage medium (e.g., the memory 130) in the form of a program module. When the instruction is executed by a processor (e.g., the processor 120), the processor may perform a function corresponding to the instruction.

Examples of the computer-readable recoding medium may include: magnetic media, such as a hard disk, a floppy disk, and a magnetic tape; optical media, such as a Compact Disc Read Only Memory (CD-ROM) and a Digital Versatile Disc (DVD); magneto-optical media, such as a floptical disk; an internal memory; and the like. The instructions may include a code made by a compiler or a code which can be executed by an interpreter. The module or program module according to various embodiments of the present disclosure may include at least one of the aforementioned elements, may further include other elements, or some of the aforementioned elements may be omitted. Operations executed by the module, program module, or other elements according to various embodiments of the present disclosure may be executed sequentially, in parallel, repeatedly, or in a heuristic manner. Alternatively, at least some operations may be executed in a different order or may be omitted, or other operations may be added.

Example embodiments of the present disclosure are provided to describe technical contents of the present disclosure and to help the understanding of the present disclosure, and do not limit the scope of the present disclosure. Therefore, the scope of the present disclosure should be construed as including all modifications or various other embodiments which are based on the technical idea of the present disclosure.

What is claimed is:

1. A User Equipment (UE) for attempting to gain access to a network, the UE comprising:
    a memory;
    a communication circuit; and
    a processor that is electrically connected to the memory and the communication circuit,
    wherein the processor is configured to:
    receive a first barring message from the network,
    determine whether the access to the network is barred, based at least on a first random variable and the first barring message,
    when it is determined that the access to the network is barred, acquire a first standby time period related to barring of the access to the network based at least on a second random variable and the first barring message,
    determine whether the access to the network is continuously barred, based at least on a third random variable and the first barring message,
    when it is determined that the access to the network is continuously barred, acquire a second standby time period related to the barring of the access to the network based at least on a fourth random variable and the first barring message, and
    provide a third standby time period obtained by adding the first standby time period and the second standby time period.

2. The UE of claim 1, wherein the processor is further configured to
    when it is determined that the access to the network is not continuously barred, activate a timer corresponding to the first standby time period, and output information corresponding to the first standby time period.

3. The UE of claim 1, wherein the processor is further configured to:
    store, in the memory, at least one of the first standby time period, the second standby time period or the third standby time period.

4. The UE of claim 2, wherein the processor is configured to control a display of the UE to display the information corresponding to the first standby time period on an area of an indicator on a screen of the display of the UE.

5. The UE of claim 2, wherein the processor is configured to:
    determine whether a signal and/or input related to origination of a voice call is received by the UE, and
    in response to determining that the signal and/or input is received, control a display to the UE to display the information corresponding to the first standby time period on a telephone call connection standby screen.

6. The UE of claim 2, wherein the processor is configured to control a display of the UE to display the information corresponding to the first standby time period on an area corresponding to at least one of multiple contacts included in a telephone call record list.

7. The UE of claim 1, wherein the first barring message includes information comprising at least one of a barring factor representing a probability of allowing the access to the network or a barring time used to acquire the first standby time period.

8. The UE of claim 1, wherein the processor is configured to:
    determine whether a signal and/or input related to origination of a voice call is received, and
    in response to determining that the signal and/or input is received, determine whether the access to the network is barred.

9. The UE of claim 1, wherein, in determining whether the access to the network is barred, the processor is configured to:
    determine that the access to the network is not barred, when a barring factor included in the first barring message exceeds the first random variable; and
    determine that the access to the network is barred, when the barring factor included in the first barring message is smaller than or equal to the first random variable.

10. A method for attempting to gain access to a network by a User Equipment (UE), the method comprising:
    receiving a first barring message from the network;
    determining whether the access to the network is barred, based at least on a first random variable and the first barring message;
    in response to determining that the access to the network is barred, acquiring a first standby time period related to barring of the access to the network based at least on a second random variable and the first barring message;
    determining whether the access to the network is continuously barred, based at least on a third random variable and the first barring message;
    in response to determining that the access to the network is continuously barred, acquiring a second standby time period related to the barring of the access to the network based at least on a fourth random variable and the first barring message; and
    providing a third standby time period obtained by adding the first standby time period and the second standby time period.

11. The method of claim 10, further comprising:
    in response to determining that the access to the network is not continuously barred, activating a timer corresponding to the first standby time period, and outputting information corresponding to the first standby time period.

12. The method of claim 10, further comprising:
storing, in a memory of the UE, at least one of the first standby time period, the second standby time period or the third standby time period.

13. The method of claim 11, wherein the information corresponding to the first standby time period is displayed on an area of an indicator on a screen of a display of the UE.

14. The method of claim 11, further comprising:
determining whether a signal and/or input related to origination of a voice call is received by the UE; and
in response to determining that of the signal and/or input is received, controlling to display the information corresponding to the first standby time period, on a telephone call connection standby screen.

15. The method of claim 11, wherein the information corresponding to the first standby time period is displayed on an area corresponding to at least one of multiple contacts included in a telephone call record list.

16. The method of claim 10, wherein the first barring message includes information comprising at least one of a barring factor representing a probability of allowing the access to the network or a barring time used to acquire the first standby time period.

17. The method of claim 10, further comprising:
determining whether a signal and/or input related to origination of a voice call is received by the UE; and
in response to determining that the signal and/or input is received, determining whether the access to the network is barred.

18. The method of claim 10, wherein the determining whether the access to the network is barred further comprises:
determining that the access to the network is not barred, when a barring factor included in the first barring message exceeds the first random variable; and
determining that the access to the network is barred, when the barring factor included in the first barring message is smaller than or equal to the first random variable.

* * * * *